United States Patent [19]

Kulka

[11] Patent Number: 5,061,872
[45] Date of Patent: Oct. 29, 1991

[54] BULB CONSTRUCTION FOR TRAFFIC SIGNALS AND THE LIKE

[76] Inventor: Thomas S. Kulka, 509 Film Building, 2108 Payne Ave., Cleveland, Ohio 44114

[21] Appl. No.: 574,055

[22] Filed: Aug. 29, 1990

Related U.S. Application Data

[63] Continuation of Ser. No. 790,139, Oct. 22, 1985, abandoned, which is a continuation-in-part of Ser. No. 320,539, Nov. 12, 1981, abandoned.

[51] Int. Cl.$^5$ .......................... H01J 5/16; F21V 3/00; F21V 7/00
[52] U.S. Cl. ..................................... 313/111; 313/113; 362/348; 362/311
[58] Field of Search ...................... 313/111, 113, 115; 362/61, 66, 67, 71, 219, 249, 250, 297, 294, 346, 348, 431, 418; 340/93, 97, 98

[56] References Cited

U.S. PATENT DOCUMENTS

| | | | |
|---|---|---|---|
| 1,590,130 | 6/1926 | Sturgeon | 362/348 |
| 1,595,533 | 8/1926 | Weems | 362/348 X |
| 4,214,168 | 7/1980 | Kulka | 362/311 |

Primary Examiner—Sandra L. O'Shea
Attorney, Agent, or Firm—Foley & Lardner

[57] ABSTRACT

A signal light particularly adapted for use in traffic signals and vehicle taillights. The signal comprises a lens having at least one central opening, a bulb mounted behind the lens, and a reflector mounted behind the bulb. The reflector has an irregular, crinkled surface in order to produce a sparkling effect in combination with the lens central opening.

15 Claims, 4 Drawing Sheets

BULB CONSTRUCTION FOR TRAFFIC SIGNALS AND THE LIKE

CROSS REFERENCE TO RELATED APPLICATIONS

This application is a continuation of application Ser. No. 06/790,139, filed Oct. 22, 1985, which is in turn a continuation-in-part of application Ser. No. 06/320,539, filed Nov. 12, 1981, both now abandoned.

BACKGROUND OF THE INVENTION

The present invention relates as indicated to a bulb construction primarily intended for use with traffic signals, although additional uses such as with automobile taillights are clearly envisioned in accordance with the invention concepts.

It is a well known fact that many drivers are color blind and are thus not able to distinguish the "green" and "red" on an ordinary traffic signal. This is particularly true during bright sunny days when it is difficult to detect the lights with good vision, and when the lenses of traffic lights and automobile taillights have accumulated dust and dirt which impairs the light transmission to a considerable extent through the lens of the light. These conditions are also a hindrance to drivers who are not color blind but do have some impairment in their vision, which impairment is not sufficient, however, to prevent their lawful driving of a motor vehicle. One solution to the above problem is disclosed in my U.S. Pat. No. 4,214,168, granted July 22, 1980. As disclosed therein, the lens for the signal was modified either by providing one or more perforations through the lens, or by providing a cover for the lens which was similarly perforated. Either the lens or lens cover is preferably red, amber or green, in the case of the traffic light environment, or red in the case of a taillight environment, with the perforations providing areas which visually interrupt the light projected by the bulb through the lens means. Thus, light transmitted through the lens or the cover where non-perforated is of the color desired in accordance with the traffic light environment, and where no perforations appear either in the lens or lens cover, the color transmitted through the perforations is that of the light transmitting means, normally clear or white. The perforations provide a constantly changing light pattern as the motorist approaches the signal, thereby resulting in a sparkling effect and greatly facilitating recognition of the signal by motorists. Although the results achieved in accordance with the invention disclosed in my patent have been entirely satisfactory, the invention concepts do require that the lens be perforated at one or more locations, or that a separate lens cover, positioned either at the front or back of the lens and containing similar perforations, be provided. It will be understood and as disclosed in my patent, where a perforated lens cover is employed, the lens is normally transparent and the lens cover the desired color of the traffic light. In any event, a separate cover is required to be provided and assembled with the lens to achieve the intended results.

In my pending application Ser. No. 170,934, filed July 21, 1980 and entitled "Lens Construction for Traffic Lights and the Like", there is disclosed the further concept of providing a flexible lens which can be snapped in place in a holder mounted at the outer end of the reflector element for the light. One or more perforations can be formed in the flexible lens, and one or more magnifying elements can be mounted in the perforations, with the invention disclosed in my pending application also including the concept of providing a rigid lens having magnifying elements, and means for retaining the lens at the outer end of the reflector. In all these modifications, it is the lens which is being modified, as opposed to the bulb which provides the light transmission means.

SUMMARY OF THE INVENTION

It is the primary object of the present invention to provide a novel bulb construction for traffic lights, taillights, and similar environments in which the face of the bulb is either coated in a particular pattern or a separate bulb covering element provided and adhesively or otherwise secured to the front face of the bulb. It has been discovered that by modifying the bulb, as opposed to the lens, the lens can be entirely eliminated, as well as the normal reflector positioned around the bulb and inwardly of the lens.

The outer face of the bulb, or the separate bulb cover which can be adhesively secured to or positioned over the bulb face, can be color patterned as desired to obtain the advantageous results intended. For example, the face of the bulb can be colored red, except for a central colorless region or a plurality of colorless regions in a specified pattern. The same applies to the bulb cover if a normal bulb is provided and the cover secured thereto or positioned thereover. Light transmitted through the colored regions of the bulb face or separate bulb cover will project the desired color, for example, red, whereas the colorless areas will project clear light. The central colorless area, and any additional colorless areas, are preferably of sufficient dimensional area so as to visually interrupt light projected by the bulb so as to provide a constantly changing light pattern as a motorist approaches the traffic signal. This sparkling effect thus provided, in combination with the projection of the color through the bulb, greatly facilitates recognition of the signal by the motorist.

If desired, the coloring of the front face of the bulb can be made during the manufacturing process. This would be particularly desirable where the bulb construction is such that a separate face member is provided and glass welded to the body of the bulb or lamp.

In a further modification, one or more magnifying elements can be provided either in the bulb face or in the separate bulb cover element secured to the bulb face. The magnifying elements can be positioned in areas which would otherwise be colorless, or combinations of colorless areas, and magnifying elements mounted in colored regions can be employed as desired. The magnifying elements serve the purpose of magnifying and thereby intensifying the light transmitted therethrough which serves the further purpose of improving recognition of the signal to approaching motorists. The magnifying elements can be either of the same color as the colored portions of the bulb face or cover element, or they can be colorless depending upon the result intended. If they are of the same color as the bulb face or bulb cover, they will still achieve the intended purpose of magnifying and thus intensifying the colored light transmitted by the bulb through the transparent lens, thereby improving visual recognition of the actuated signal to the oncoming motorist. Where the magnifying elements are transparent and colorless, they will similarly provide a visual interruption of the light projected through the colored regions of the bulb face or bulb cover element, thereby providing the constantly changing light pattern and sparkling effect intended.

These and other objects will be apparent as the following description proceeds in particular reference to the application drawing.

DETAILED DESCRIPTION OF THE PREFERRED EMBODIMENTS

Figure 1:
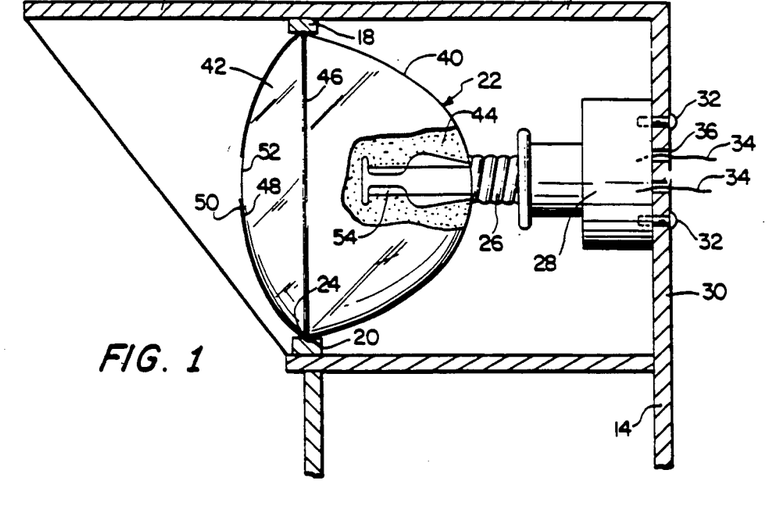
FIG. 1 is a fragmentary vertical cross-sectional view showing a section of a traffic signal, in which the bulb constructed in accordance with the present invention is mounted.

Referring now to the application drawings, wherein like parts are indicated by like reference numerals, and initially to FIG. 1, there is illustrated therein fragmentarily a section of a traffic signal generally indicated at 10. Only the top traffic light is shown in FIG. 1, and it will be understood that the traffic signal normally comprises three separate traffic lights vertically arranged, or perhaps a fourth light if a flasher signal is provided. A typical complete traffic signal is shown in my issued U.S. Pat. No. 4,214,168, referred to above. Since the improved bulb construction in accordance with the present invention is suitable for each individual traffic light, only a single such light has been illustrated in FIG. 1.

The traffic signal 10 comprises a housing 12 mounted on a supporting post 14, the construction of which forms no part of the present invention. The housing 12 in the form shown is preferably circular, and it will be understood that similar housings are positioned below the housing 12 shown to accommodate a complete series of arterial signals. A visor 16 is integrally formed with the housing 12 and extends forwardly thereof to perform the normal function of directing the light from the signal forwardly. Since the housing 12 shown in FIG. 1 is essentially duplicative of the signal housings positioned below housing 12 on the post 14, only one such housing need be illustrated in the application drawings.

Positioned in the housing 12 is a preferably annular mounting ring 18 having an inner annular groove 20 to support the bulb, generally indicated at 22. Neither the housing 12 nor mounting ring 18 are required to be circular, although this structure is normally preferred in view of the circular nature of the outer configuration of the bulb. If the housing 12 and mounting ring are other than circular, the dimensioning of the groove 20 must be such that the outer edge 24 of the bulb fits into the ring for retention thereby. Alternatively, the ring can be formed of compressible material so as not to require a groove for frictionally retaining the bulb.

The mounting ring 18 can be axially adjustably secured in the housing in any suitable manner, for example, by bonding, metal fasteners or the like. In this manner, the bulb 22, by means of its threaded base 26, can be threadedly secured in the socket 28 in conventional manner to establish electrical contact. If desired, other methods of electrical connection can be employed. The socket in turn is mounted on the back wall 30 of the housing by both 32 or the like. Lead wires 34 extend from the socket 28 through openings 36 in the rear wall 30 to a source of electrical power, the nature and location of which forms no part of the present invention. The adjustable mounting of the ring 18 permits the necessary screw attachment of the bulb to the socket while retaining the edge of the bulb in the groove 20 in the ring.

Referring in more detail to the construction of the bulb 22, the same comprises a housing section 40 to which is attached the screw base 26, and a signal face 42. The interior or exterior surface of the housing 40 is preferably coated with a highly reflective material such as reflective aluminum coating or the like, shown by stippling at 44, to reflect the light source forward through the signal face of said housing and through the colorless areas thereon, or through magnifying elements hereinafter described. The signal face 42 is preferably transparent and colored, and can be integrally formed with the housing 40 or separately formed and attached thereto. The parting line 46 between the housing and the signal face simply delineates the extent of the signal face from the housing, and in the form shown the signal face is integrally formed with the housing during formation of the bulb by molding or the like. By providing the highly reflective coating 44 on the interior surface of the housing, all of the light produced by the bulb is transmitted through the signal face.

The signal face 42 can, as noted, be colored during formation of the bulb, or can be subsequently coated on its exterior surface with the desired color coating. To emphasize this, the signal face surface is indicated at 48 and a much exaggerated coating layer is shown at 50.

Whether the signal face is formed with color, or color subsequently applied thereto, there is provided at least one colorless area on the face, with FIG. 1 showing such area at 52 generally centrally of the bulb and immediately in front of the bulb filament 54. If the color is integrally formed during the molding process, the center portion 52 will remain colorless and the areas there-around colored. In FIG. 1, the bulb 22 is intended to represent the top bulb of the traffic signal, and the color of the signal face would accordingly be red, with a clear center portion 52. Similarly, the bulbs positioned on the post below the bulb 22 shown would be colored amber and green, respectively.

The filament 54 provides the necessary illumination and does not per se form part of the present invention. The filament can be constantly or intermittently actuated to provide a steady or flashing light, as desired. As will be presently described, the flashing light together with the sparkling effect provided by the opening 52, or by a plurality of openings, is particularly pronounced.

Although only colorless area or region 52 has been shown in the signal face 42, it will be understood that a plurality of colorless areas could be provided, with the arrangement of these being as desired.

The bulb 22, before modification in accordance with the present invention, can comprise any commercially available bulb construction, for example, the PAR-38 and R-30 bulbs currently manufactured by General Electric Company. The bulb normally used with commercially available sealed beam lamps used on automobiles can also be employed. The PAR-38 bulb comprises a separate bulb face which can be glass welded or otherwise secured to the bulb housing, and the R-30 bulb is a simple, normally clear one-piece glass envelope. Any lamp is satisfactory which possesses the necessary wattage and long life characteristics preferable for either traffic signal use or use with vehicle taillights. In this regard, it will be readily apparent that the concepts of the invention can be used for vehicle taillights in addition to the illustrated traffic light environment.

Referring to the invention thus far described, the novel results achieved in accordance with the present invention are as follows. When the filament 54 is actuated, light is directed directly through the colored areas of the signal face as well as the colorless area 52 illustrated, it being understood that more than a single colorless area can be provided. The reflective coating 44 formed on the housing 40 focuses the illumination through the signal face and particularly the colorless region 52. Since the path of travel of the oncoming motorist is not perfectly smooth, but vertically disrupted by undulations in the road surface, the motorist will be subjected to a continually changing view of the light emanating from the colorless region 52. This changing pattern is enhanced by the continually changing side angle between the motorist and the traffic light as the motorist approaches the signal. Due to both the changing approach angle and the vertical movement relative to the traffic light, continually changing beam patterns will be visible through the colorless area 52, or areas in the event there is more than one, thereby providing a pronounced sparkling effect on the motorists. Thus, not only is the motorist subjected to the red light passing through the colored portions of the signal face, but he is subjected to the sparkling effect through the center of the signal face, or possibly other areas in addition the center, all of which tend to strongly reinforce the appearance and recognition of the signal. This reinforcement is important for drivers who have somewhat impaired vision but are nevertheless properly licensed to drive motor vehicles.

Figures 2, 3, 4, 5, 6:
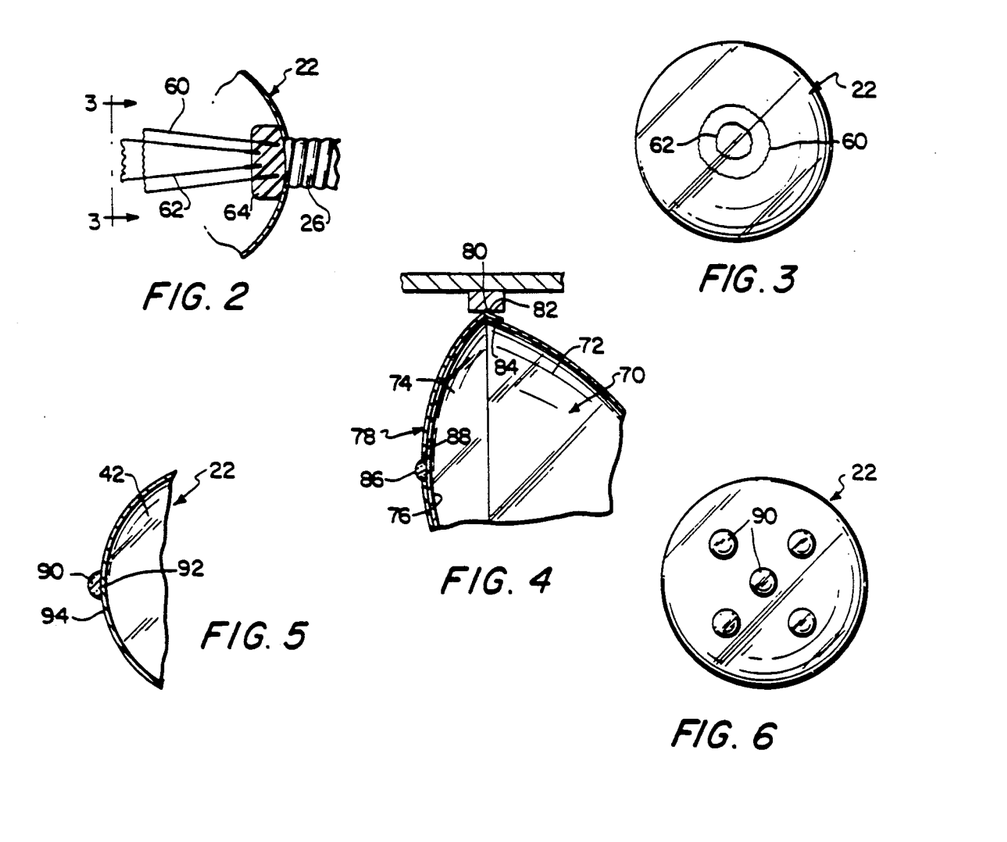
FIG. 2 is a fragmentary side elevational view of a modified bulb filament construction.
FIG. 3 is a view of the filament construction of FIG. 2, taken in line 3—3 of FIG. 2.
FIG. 4 is a fragmentary side elevational view of a modification of the invention in which a bulb cover or cap covers the face of the bulb.
FIG. 5 shows a bulb construction having a magnifying element mounted in the face of the bulb.
FIG. 6 is a front view of a bulb having a plurality of magnifying elements.

Referring to FIGS. 2 and 3, there is illustrated therein a different form of filament construction which can be used with bulb 22. The bulb 22 and screw base 26 have been shown fragmentarily in FIG. 2. The filament assembly comprises a primary incandescent filament 60 and a secondary, halogen filament 62 or any other suitably small filament. Both filaments are mounted in a glass filament base 64 in conventional fashion. Either one or both of the filaments can be constantly or intermittently actuated, and the halogen filament provides a very intense light, as well known in the art. Preferably, filament 62 is positioned centrally of the central clear aperture and closer to the clear aperture to project a constant or flashing beam of light through the central aperture. Filament 60, on the other hand, is larger and sufficiently bright to illuminate the signal face. Of course, while both filaments may be enclosed in one master envelope, the halogen filament must also be enclosed in its own separate envelope which is of sufficient strength to accept the type of gas and gas pressure required by the halogen filament.

In some instances, it may be preferred to use a bulb cover or cap, rather than providing the signal face with colored or non-colored regions as above described. In FIG. 4, a bulb generally indicated at 70 is illustrated, comprising a housing 72 (fragmentarily shown), and a signal face 74. The outer surface 76 of the signal face is transparent and colorless, and a bulb cap or cover generally indicated at 78 can be snapped thereover. The cap is formed with an outer projection 80 which snaps into the groove 82 formed in the mounting ring 18 in the manner previously explained. A retaining flange 84 is provided on the cap which extends over the adjacent surface of the housing 72 to retain the cap on the signal face and housing.

Although the cap can be colored as previously described, and provided with a colorless central region, or a plurality of additional colorless regions, FIG. 4 illustrates the cap being formed with a magnifying element 86 formed centrally in the cap. The magnifying element 86 is preferably colorless and functions to magnify the light directed therethrough. The magnifying element can be embedded in an opening 88 provided therefor in the cap, as shown in FIG. 4, or bonded to the outer or inner surface of the cap. In the latter instance, the area of the cap on which the magnifying element is mounted will be colorless, and the magnifying element likewise colorless, so as to delineate colored and non-colored light transmitted through the lens cover. Thus, colored light is transmitted through the transparent colorless signal face and the transparent colored cap, except for the central portion thereof. It will be understood that a plurality of magnifying elements can be provided in a desired pattern on the cap, either embedded through the cap as shown in FIG. 4, or bonded to the outer surface of the cap as described. In either instance, the magnifying elements are preferably transparent and colorless.

Referring to FIGS. 5 and 6, there is illustrated therein a modification of the bulb 22 of FIG. 1. In this modification, referring first to FIG. 5, a single magnifying element 90 is adhesively or otherwise bonded to the colorless region 92 of the signal face 42, with the colored region of the face being depicted by the outer surface or coating 94. In other words, rather than simply providing a colorless region 52 as in FIG. 1, a magnifying element 90 is additionally provided thereby serving to magnify and thus intensify the colorless light transmitted through the central region of the bulb. The bulb 22 has been shown fragmentarily in FIG. 5. The element 90 can alternatively be integrally formed with the signal face, or positioned and secured in an opening in the face.

FIG. 6 comprises a front view of a further modification similar to FIG. 5 except that a plurality of magnifying elements 90 have been mounted on the signal face of the bulb, although they could be integrally formed or extend through the face, as noted above. It is again preferred that the magnifying elements be colorless and that the regions of the signal face immediately adjacent the magnifying elements likewise be colorless so as to pass colorless light through the magnifying elements, as opposed to the colored light passing through the remainder of the signal face. The provision of a plurality of magnifying elements simply increases the sparkling effect of the bulb, as previously described.

Although a transparent signal face or bulb cap has been referred to above, the signal face or cap could be translucent as well, although the intensity of light through the colorless areas would be consequently diminished. In addition, depending on the particular use and environment, the colored region of the bulb face or cap could be entirely opaque, with light being directed only through the colored or non-colored regions of the bulb face or cap. For example, referring to FIG. 1, the entire surface of the signal face could be opaque except for the region 52, which can be colorless or colored, and either transparent or translucent. If colored, for example, red, the light designation would appear only through the colored region and would serve as the only indicator to the oncoming motorist of the signal actuated. The provision of opaque and colored or noncolored regions on the bulb face or cover would have particularly strong visual impact when used on taillights, with the oncoming motorist being subjected to a very intense light beam.

It will thus be seen that by providing one or more colorless regions on the face of the otherwise colored bulb, possibly in addition with one or more magnifying elements, a highly desired sparkling effect is provided. Since such effect is accomplished through modification of the bulb, the normal lens for the signal can be entirely eliminated, as can the normal reflector positioned within the housing and around the bulb. Thus, a highly simplified and inexpensive arrangment is provided. The signal can be either constant or intermittent and the filament construction selected so as to provide the desired intensity. The use of a primary filament and a second halogen filament are particularly effective for providing intense light, which further magnifies the sparkling effect of the entire assembly.

Figure 7:
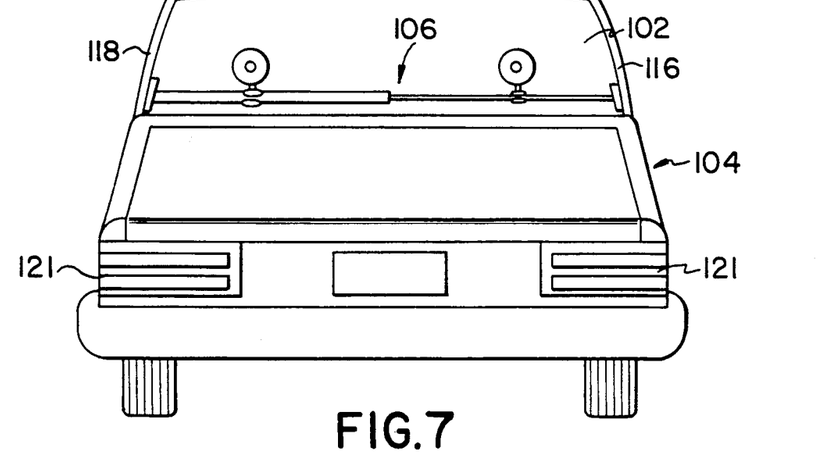
FIG. 7 shows an automobile using signal lights mounted in a rear window according to the present invention.
Figure 8:
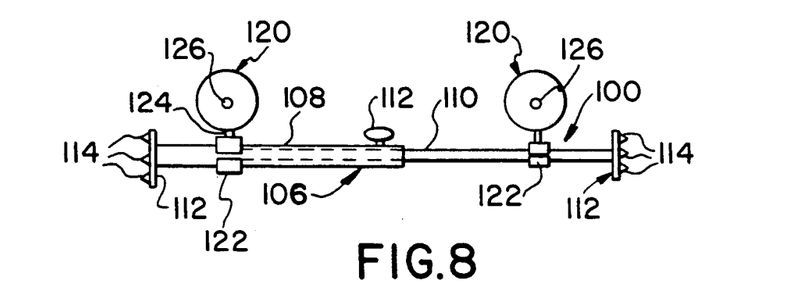
FIG. 8 shows a mounting bracket for the signals of the present invention.

FIGS. 7 and 8 show a taillight lens construction according to the present invention used in a raised taillight apparatus 100 which is mounted to be visible through the rear window 102 of an automobile 104. Apparatus 100 comprises a telescoping pole 106 having a larger diameter tubular section 108 which receives a smaller diameter section 110 in a manner to permit the length of pole 106 to be adjusted as desired. A thumb screw 112 is threaded through tubular section 108 so as to provide a pressure engagement against section 110 to maintain a desired adjusted length.

To maintain the pole within a vehicle, each pole section 108, 110 has an end piece 112 fitted to it. End pieces 112 may be welded or retained on the sections 108, 110 by any convenient means. Each end piece 112 comprises a metal plate having elements 114 to increase friction. These elements may be pins, foamed rubber or the like.

In use, pole 106 is positioned within the vehicle compartment and expanded until end pieces 112 engage opposite rear side pillars 116 and 118 of the vehicle. A firm frictional engagement is made whereupon thumb screw 112 is tightened to hold pole 106 in place. If desired, end pieces 112 may be pivoted on pole 106 to facilitate this attachment.

A pair of mounting elements 122 are attached, respectively, to pole sections 108 and 110. Mounting elements 122 may be conventional C-clamps which are held to their respective pole sections with bolts, or the like. Alternatively, mounting elements 122 may be welded or glued directly to the pole sections. In either case, the mounting elements 122 include threaded holes to receive threaded extensions 124 so as to mount the taillights 120. As will be discussed below, threaded extensions 124 are hollow, as are pole sections 108 and 110, so that the wiring for the taillights 120 can pass through the pole sections.

Taillights 120 utilize lenses having a single aperture 126. It has been found that the single aperture lens construction produces a more noticeable sparkle effect. By placing the taillights 120 above the vehicle's conventional taillights 121 and providing them with a sparkle producing aperture 126, a much more noticeable indication of the driver's actions will be produced. This enhances safety and reduces traffic collisions.

Figure 10:
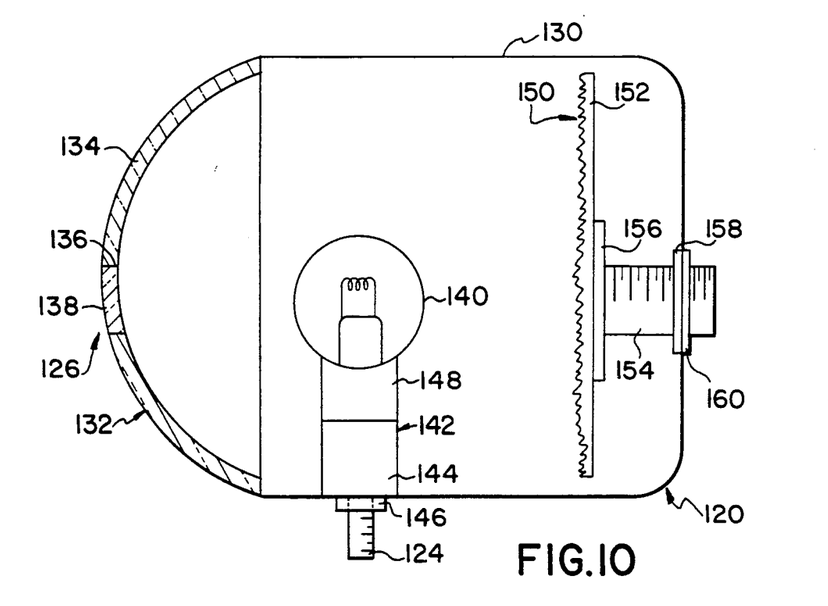
FIG. 10 is an elevational cross sectional view of a signal according to the present invention.

FIG. 10 shows the taillight 120 in further detail. The taillight 120 includes a housing 130 which may be metal, plastic or the like. Housing 130 is opaque and mounts lens 132 which comprises a colored lens portion 134 having an opening 136 filled with a clear material 138. The opening 136 with material 138 forms the aperture 126.

Within housing 132, the bulb 140 and bulb mounting structure 142 are secured. Mounting structure 142 comprises a base 144 having threaded extension 124 which passes through an opening in housing 130. A nut 146 secures base 144 to the housing 130. Bulb 140 has a base 148 which is received within base 144 in a conventional manner. Bulb 140 may be approximately 50 candle power.

A reflector 150 is mounted within housing 130 approximately 3 inches from the filament of bulb 140. Reflector 150 comprises a reflecting plate 152 mounted to a threaded shaft 154 through a mounting plate 156. Shaft 154 passes through an opening in housing 130 and is secured by a pair of nuts 158 and 160.

The reflecting surface of plate 152 is crinkled or irregular for the purpose of enhancing the sparkle effect produced through opening 136. This is because a crinkled reflector breaks up the light falling on it into dispersed rays which enhance the sparkle effect produced by opening 136. Reflector 150 is adjustable such that the distance between bulb 140 and reflector 150 can be adjusted to produce the maximum sparkle.

Figure 11:
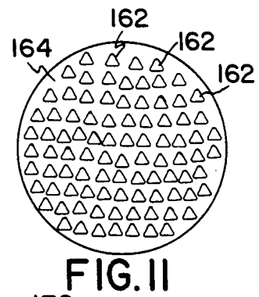
FIG. 11 shows one embodiment of a reflector for use in the signal according to the present invention.

In order to produce a crinkled reflector surface, small pieces of reflective material 162 may be glued or otherwise attached to a substrate 164 as shown in FIG. 11. The reflective material 162 may be cut in random patterns and may overlap one another so as to produce a shimmering pattern. This type of pattern is ideal for enhancing the sparkle effect produced apertured lens 132.

Figure 12:
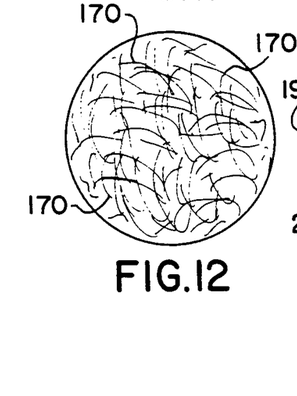
FIG. 12 shows a second embodiment of a reflector for use in the signal according to the present invention.

Alternatively, a reflective material such as aluminum foil or the like may be provided with a plurality of crease lines 170 as shown in FIG. 12. Lines 170 merge and cross each other to produce a randomly crinkled surface which disperses impinging light in a semi-random pattern. This type of crinkle effect can also be produced by molding plastic or other suitable material with an appropriate pattern which is then coated with reflective coating. Again, the random line pattern of FIG. 12 is ideal for randomly dispersing light so as to enhance the sparkle effect produced by lens 132.

Figure 9:
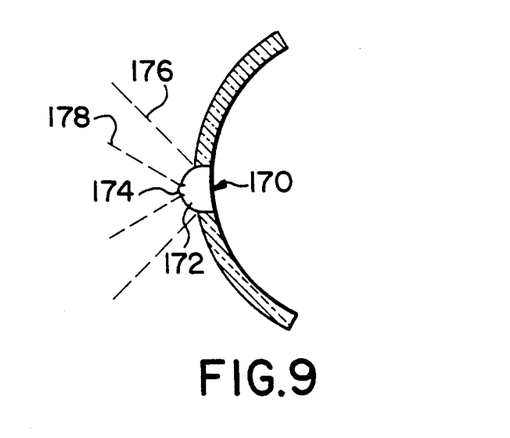
FIG. 9 shows a lens according to the present invention using a bifocal center magnifying element.

Another way to increase the sparkle effect is by using a bifocal central aperture lens 170 shown in FIG. 9. This lens comprises a 70 millimeter F.1 lens 172 with a central portion comprising a 40 millimeter F.1 lens 174 to provide two radiation patterns. The radiation pattern for lens 172 is indicated in phantom by lines 176 and the radiation pattern for lens 174 is indicated in phantom by lines 178. Lens 170 would be used in opening 136 of FIG. 10 in place of the clear portion 138. This enhances the sparkle effect and thus makes the taillight 120 more visible to an approaching motorist.

It will be understood that, although taillight 120 has been described as containing a separate bulb 140 and lens 132, the lens pattern can be applied directly to the bulb as discussed relative to FIG. 1. Applying the lens pattern directly to the bulb may, in some situations, provide a more convenient method of manufacture.

Figure 13:
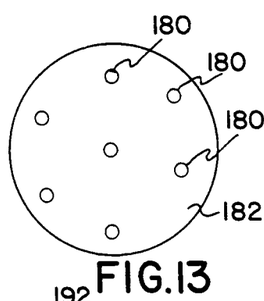
FIG. 13 shows a lens with multiple apertures.

Furthermore, although a single central aperture has been found to be the most effective for producing a sparkle effect, a multi-aperture lens may also be used. For example, FIG. 6 shows the lens having five apertures 90 and FIG. 13 shows a lens having seven apertures 180 formed in lens material 182. The lens material 182 is preferably colored and translucent. However, this lens material may be opaque in certain circumstances where a surrounding colored lens is not desirable.

Figure 15:
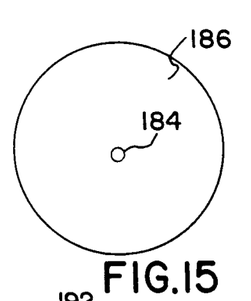
FIG. 15 shows a single aperture lens.

In addition, FIG. 15 shows the case where a single aperture 184 is formed in a lens 186 which is opaque. As discussed relative to lens 132, the surrounding lens is preferably colored and translucent. However, as shown in FIG. 15, circumstances may arise where it is preferable to have the surrounding lens material 186 opaque.

Figure 14:
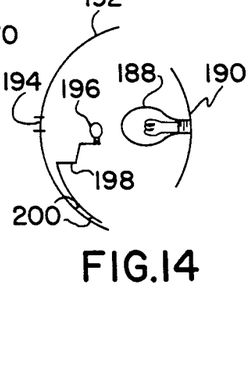
FIG. 14 shows a signal according to the present invention with a high intensity light mounted to the lens.

FIG. 14 shows an embodiment of the invention where a bulb 188 is mounted directly to a crinkled reflector 190 which is curved. A lens 192 is positioned in front of bulb 188 and may be similar to any of the lenses discussed above. A central aperture 194 is formed in the lens and may or may not contain a magnifying element as discussed above. A second bulb 196 is positioned directly behind opening 194 in front of bulb 138. Bulb 196 is preferably a tungsten halogen bulb and need not be positioned at the focal point of reflector 190. The purpose of bulb 196 is to pass a ray of light directly through opening 194. Bulb 196 may be designed to blink to even further increase the sparkle effect of the invention. The crinkling on reflector 190 does not have any effect on the light emitted from bulb 196 since it is so close to opening 194. The bulb 196 is designed to produce only a small spot in the center of the lens having a size of ½ to ¾ of an inch.

Tungsten halogen bulb 196 is connected to a bracket 198 that is mounted directly to a lens 192. The bracket may be riveted or glued as shown at 200.

Figure 16:
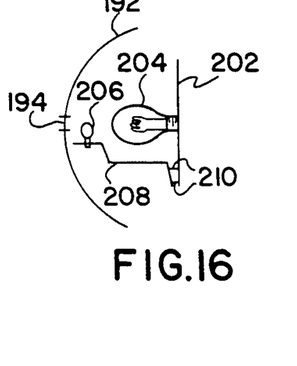
FIG. 16 shows a signal according to the present invention having a high intensity light mounted to the reflector.

As an alternative to FIG. 14, FIG. 16 shows a similar arrangement except that a planar crinkled reflector 202 is used instead of a curve reflector 190. Reflector 202 is similar to reflector 150 of FIG. 10 except that a bulb 204 is mounted directly to it. In addition, a second bulb 206 which comprises a tungsten halogen bulb is mounted directly behind central aperture 194 in front of bulb 204. In this case, however, bulb 206 is placed on a mounting bracket 208 which is attached directly to reflector 202 by the use of rivets, glue or the like shown at 210. Again, bulb 206 may be designed to blink.

The foregoing discussion of the embodiments set forth in FIGS. 9-16 relate to a taillight lens for vehicles. The constructions discussed are particularly suitable for use on a raised taillight apparatus as discussed relative to FIGS. 7 and 8. As will be understood from the foregoing, the present invention provides a taillight construction which, through the use of a colored lens portion, provides information as to a driver's actions in a conventional manner. In addition, through the use of the mounting apparatus of FIGS. 7 and 8, which raise the taillight to a position above the conventional vehicle taillight, and through the use of at least one central aperture in the taillight lens combined with a crinkled reflector, the attention of other motorists will be drawn to the taillight by virtue of the sparkle effect produced in the apertured lens. This sparkle effect can be further enhanced by the use of a blinking tungsten halogen bulb as discussed relative to FIGS. 14 and 15 as well as the use of a bifocal magnifying lens, as discussed relative to FIG. 9. In combination, the various elements of the present invention provide a safer and more effective taillight structure for communicating information between drivers on a road.

Figure 17:
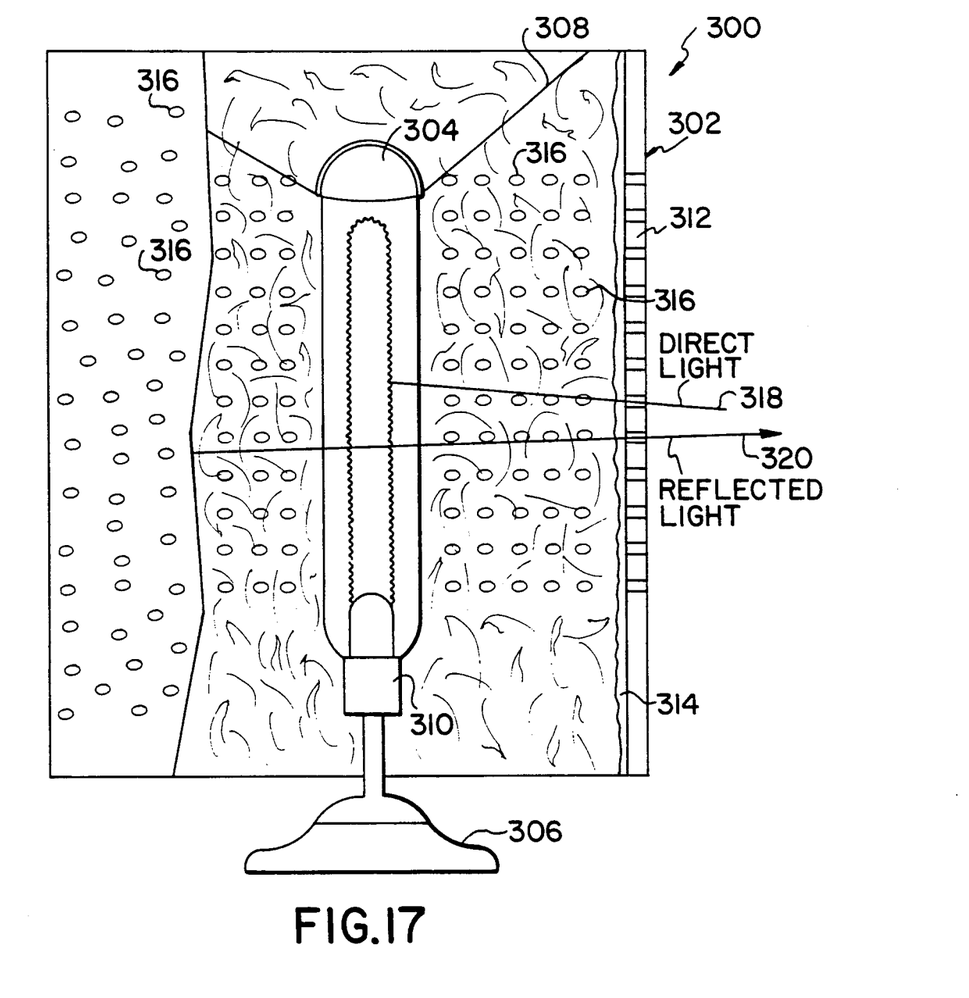
FIG. 17 shows a lampshade produced in accordance with the present invention.

FIG. 17 shows an application of the sparkle principle of the present invention as it applies to a lamp 300. Lamp 300 includes a lampshade 302 which is connected to a bulb 304 mounted in a base 306. The shade 302 may be connected to bulb 304 through a conventional mounting bracket 308.

Bulb 304 is preferably unfrosted and either may be clear or colored depending on the color of light desired. The bulb 304 is received in a socket 310 which is mounted to base 306 in a conventional manner.

The shade 302 is shown cylindrical but may be of any design such as globular or the like, and may be faceted. The shade comprises a main body 312 which may be formed of any shape-sustaining material such as glass, plastic, metal or the like and may include a textile covering or an artistically crafted material covering. The body 12 or the covering may be of any color, may be varied in color, or may be noncolored, translucent or opaque.

A reflective surface 314 is attached inside of the shade body 312. The reflective surface 314 may be smooth, but is preferably crinkled. This surface may be formed of individual reflective components as discussed above relative to FIG. 11, or may be formed of crinkled aluminum foil as discussed above relative to FIG. 12.

A plurality of holes 316 are formed through the entire shade so that light from the bulb 304 can pass directly through the holes as shown by arrow 318, or light can be reflected from the opposite side of the shade and passed through holes 316 as shown by arrow 320.

It should be noted that the holes 316 will aid in cooling the light bulb 304 but the primary purpose of the holes 316 is to produce a sparkle effect. This sparkle effect is produced by making the holes relatively small as compared to the distance between the holes and the light source so that movement of an observer relative to the shade 312 will create the appearance of a sparkle. This sparkle is further enhanced by the crinkled reflective surface 314 since light will be dispersed unevenly from the reflective surface.

It will be understood that the primary purpose of the lamp 300 of the present invention is to provide an interesting and esthetically pleasing appearance. To enhance this appearance, the holes 316 may be filled with colored translucent or transparent material to produce a colored sparkle effect, the holes may be left open, or the holes may be filled with clear material.

Alternatively, a colored sparkle may be achieved by a colored unfrosted light bulb. Further, rather than filling the holes 316 directly, a colored film may be applied to the inner surface of the shade 302.

Furthermore, as discussed above, the present invention is particularly suitable for use as a traffic signal in which case three of the assemblies shown in FIG. 18 would be used to indicate, respectively, red, yellow and green. The sparkle effect enhanced by a crinkle reflector would be very useful in such an application to draw the driver's attention to the lighted signal.

What is claimed is:

1. A signal light construction, comprising:
   a housing having an open front;
   a reflector mounted in a rear portion of said housing, said reflector having a diffusion means with macroscopic diffusion elements for breaking up light falling on it into dispersed rays;
   a light bulb mounted in said housing and spaced in front of said reflecting surface; and
   a lens structure having a plurality of openings through which light reflected from said reflector can be transmitted, and having a surrounding colored area;
   wherein light passing through said openings sparkles due to said light being visually interrupted when passing through said openings as a motorist approaches said signal by virtue of the viewing angle of the motorist relative to said bulb being changed as the motorist approaches said signal, and wherein said sparkle effect is enhanced by said diffusion means of said reflector.

2. A combination as set forth in claim 1 including a high intensity bulb positioned in said signal between said first mentioned bulb and said central opening.

3. A combination as set forth in claim 2 wherein said high intensity bulb produces a flashing light.

4. A signal as set forth in claim 1 wherein said reflector is curved.

5. A signal as set forth in claim 1 wherein said reflector is planar.

6. A signal as set forth in claim 1 for including means for adjusting the distance between said reflector and said bulb.

7. A signal as set forth in claim 1 including a bifocal magnifying element disposed in said central opening, said bifocal magnifying element having a larger magnifying element with a smaller magnifying element contained therein.

8. A signal as set forth in claim 1 wherein said at least one central opening comprises only a single opening.

9. A signal as set forth in claim 2 including a mounting bracket connected to said lens for mounting said high intensity bulb.

10. A signal as set forth in claim 2 including a mounting bracket for said high intensity bulb, said mounting bracket being connected to said reflector.

11. A light fixture construction, comprising:
    a mounting structure;
    a light bulb mounted in said mounting structure;
    a reflector mounted in a manner so as to reflect light received from said light bulb; and
    a perforated surface mounted so as to surround said reflector and said light bulb, said perforated surface having openings which are relatively small as compared to the distance between said perforated surface and said light bulb, wherein said reflective surface has a non-uniform reflective pattern with macroscopic diffusion elements for breaking up the light falling on it into dispersed rays.

12. A device as set forth in claim 11 wherein said mounting structure is the base of a lamp, said lamp including a lamp shade, said lamp shade being perforated to form said perforated surface and said reflective surface being formed on an inner surface of said lamp shade.

13. A device as set forth in claim 12 wherein said bulb is unfrosted.

14. A device as set forth in claim 12 wherein said perforations are covered with a colored transparent material.

15. A signal light construction, comprising:
    a housing having an open front;
    a reflector mounted in a rear portion of said housing having a diffusion means with macroscopic diffusion element for breaking up the light falling on it into dispersed rays;
    a light bulb mounted in said housing and spaced in front of said reflector;
    a lens structure having a plurality of openings through which light reflected from said reflector can be transmitted, and having a surrounding colored area, wherein light passing through said openings sparkles due to said light being visually interrupted when passing through said openings as a motorist approaches said signal by virtue of the viewing angle of the motorist relative to said bulb being changed as the motorist approaches said signal, and wherein said sparkle effect is enhanced by said diffusion means of said reflector; and
    a mounting apparatus comprising a telescoping pole mounting said signal, said telescoping pole having two telescoping sections and means for fixing said telescoping sections relative to one another, and mounting elements on ends of said two telescoping sections for connecting said telescoping pole inside of a motor vehicle so as to be viewed through a rear window of said motor vehicle.

* * * * *